US012717068B2

(12) United States Patent
Yin et al.

(10) Patent No.: US 12,717,068 B2
(45) Date of Patent: Aug. 25, 2026

(54) BASE MATERIAL AND FORMATION METHOD THEREOF, AND ELECTRONIC DEVICE

(71) Applicant: Lenovo (Beijing) Limited, Beijing (CN)

(72) Inventors: Ting Yin, Beijing (CN); Detao You, Beijing (CN); Jianglong Li, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 664 days.

(21) Appl. No.: 17/688,573

(22) Filed: Mar. 7, 2022

(65) Prior Publication Data

US 2023/0071142 A1 Mar. 9, 2023

(30) Foreign Application Priority Data

Sep. 3, 2021 (CN) ......................... 202111034444.3

(51) Int. Cl.
*G02B 1/12* (2006.01)
*G02B 1/14* (2015.01)
*G02B 1/18* (2015.01)

(52) U.S. Cl.
CPC ................ *G02B 1/12* (2013.01); *G02B 1/14* (2015.01); *G02B 1/18* (2015.01)

(58) Field of Classification Search
CPC ... G02B 1/10; G02B 1/12; G02B 1/14; G02B 1/18; G02B 1/115; G02B 1/16; G09F 13/10; G09F 13/06
See application file for complete search history.

(56) References Cited

U.S. PATENT DOCUMENTS 9,236,206 B1 * 1/2016 Chou .................. H01H 13/705
2017/0003754 A1 * 1/2017 Geary .................. G06F 3/0238
2018/0011547 A1 * 1/2018 Satou .................. H01H 13/83
2019/0321169 A1 * 10/2019 Nguyen .................. A61F 2/24
2020/0321169 A1 * 10/2020 Xiao .................. H01H 13/14
2022/0007531 A1 * 1/2022 Chiu .................. C25D 11/30

FOREIGN PATENT DOCUMENTS

CN 102667996 A * 9/2012 .......... G02B 6/0043
CN 102956386 A * 3/2013
CN 211604989 U * 9/2020 ............ H01H 3/125
CN 111987133 A * 11/2020 .......... H01L 27/3211

* cited by examiner

*Primary Examiner* — Sharrief I Broome
*Assistant Examiner* — Journey F Sumlar
(74) *Attorney, Agent, or Firm* — ANOVA LAW GROUP, PLLC

(57) ABSTRACT

A base material, a formation method, and an electronic device are provided in the present disclosure. The base material includes a transparent substrate, including a first surface and a second surface which are opposite to each other; a first film layer disposed over the first surface of the transparent substrate, where the first film layer includes a first light transmittance and includes a hollowed region and a non-hollowed region; and the hollowed region is used as a first graphic mark; and further includes a second film layer disposed over the first film layer, where the second film layer includes a second light transmittance and a set color, where the first light transmittance is less than the second light transmittance.

9 Claims, 7 Drawing Sheets

BASE MATERIAL AND FORMATION METHOD THEREOF, AND ELECTRONIC DEVICE

CROSS-REFERENCE TO RELATED APPLICATION

This application claims the priority of Chinese Patent Application No. 202111034444.3, filed on Sep. 3, 2021, in the China National Intellectual Property Administration, the content of which is incorporated herein by reference in its entirety.

TECHNICAL FIELD

The present disclosure generally relates to the field of electronic device technology, and, more particularly, relates to a base material and its formation method, and an electronic device.

BACKGROUND

In the existing technology, when forming a base material of an electronic device component, a specific graphic mark may be formed on a substrate by ink printing, or the graphic mark may be formed by an etching method after forming a coating layer on the substrate. In order to protect the graphic mark, a protective layer may also be formed on the outside of the graphic mark.

The above-mentioned method for forming the graphic mark on the surface of the base material may have a single display effect of formed mark and may not meet diverse display requirements of the user's key mark.

SUMMARY

One aspect of the present disclosure provides a base material, applied to an electronic device. The base material includes a transparent substrate, including a first surface and a second surface which are opposite to each other; a first film layer disposed over the first surface of the transparent substrate, where the first film layer includes a first light transmittance and includes a hollowed region and a non-hollowed region; and the hollowed region is used as a first graphic mark; and further includes a second film layer disposed over the first film layer, where the second film layer includes a second light transmittance and a set color, where the first light transmittance is less than the second light transmittance.

Another aspect of the present disclosure provides a base material formation method. The method includes providing a transparent substrate, where the transparent substrate includes a first surface and a second surface which are opposite to each other; forming a first film layer over the first surface of the transparent substrate, where the first film layer includes a first light transmittance and includes a hollowed region and a non-hollowed region; and the hollowed region is used as a first graphic mark; and forming a second film layer over the first film layer, where the second film layer includes a second light transmittance and a set color, where the first light transmittance is less than the second light transmittance.

Another aspect of the present disclosure provides an electronic device. The electronic device includes a base material. The base material includes a transparent substrate, including a first surface and a second surface which are opposite to each other; a first film layer disposed over the first surface of the transparent substrate, where the first film layer includes a first light transmittance and includes a hollowed region and a non-hollowed region; and the hollowed region is used as a first graphic mark; and further includes a second film layer disposed over the first film layer, where the second film layer includes a second light transmittance and a set color, where the first light transmittance is less than the second light transmittance. The electronic device includes a light-emitting element on a side of the base material facing the second surface of the transparent substrate, where when the light-emitting element is controlled to turn on, backlight passes through the hollowed region to display the first graphic mark; and when the light-emitting element is controlled to turn off, the second film layer is configured to reduce visibility of the first graphic mark.

BRIEF DESCRIPTION OF THE DRAWINGS

To clearly describe the technical solutions of various embodiments of the present disclosure, the drawings need to be used for describing various embodiments are described below. Obviously, the drawings in the following description are merely some embodiments of the present disclosure. For those skilled in the art, other drawings may be obtained in accordance with these drawings without creative efforts.

The structures, proportions, sizes and the like shown in the drawings in the present disclosure are merely used to cooperate with the contents disclosed in the specification for those skilled in the art to understand the present disclosure and are not intended to limit the implementable condition of the present disclosure and thus have no substantive technical significance. Any modifications of structures, changes of proportional relationship or adjustments of sizes, without affecting the generated effect and achievable objective of the present disclosure, should still fall within the scope that the technical content disclosed in the present disclosure can cover.

DETAILED DESCRIPTION

The technical solutions in embodiments of the present disclosure are clearly and completely described below with reference to the accompanying drawings in embodiments of the present disclosure. Obviously, described embodiments are only a part of embodiments of the present disclosure, but not all embodiments. Based on embodiments in the present disclosure, all other embodiments obtained by those skilled in the art without creative efforts shall fall within the protection scope of the present disclosure.

To clearly explain above-mentioned objectives, features and advantages of the present disclosure, the present disclosure is further described in detail below with reference to accompanying drawings and embodiments.

FIGS. 1-5 illustrate an exemplary process of a keycap formation method according to various disclosed embodiments of the present disclosure. The formation method may include following exemplary steps.

Figure 1:
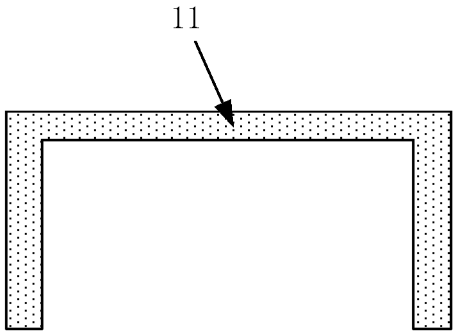
FIGS. 1-5 illustrate an exemplary process of a keycap formation method according to various disclosed embodiments of the present disclosure.

At S1, as shown in FIG. 1, a transparent shell 11 may be provided.

Figure 2:
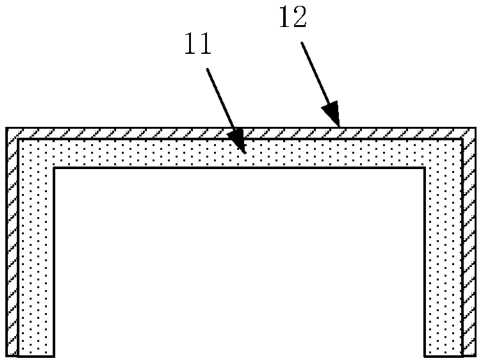

At S2, as shown in FIG. 2, a base layer 12 may be formed on the outer surface of the transparent shell 11. In such manner, the base layer 12 may be light-transmitting.

Figure 3:
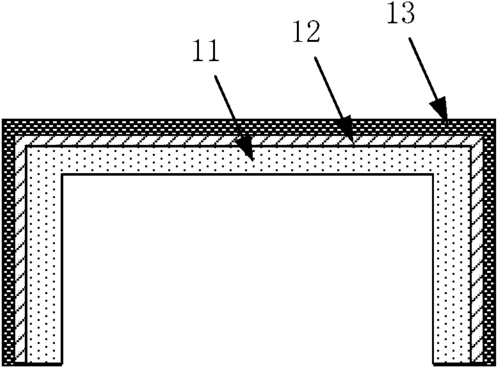

At S3, as shown in FIG. 3, a black ink layer 13 may be formed on the surface of the base layer 12.

Figure 4:
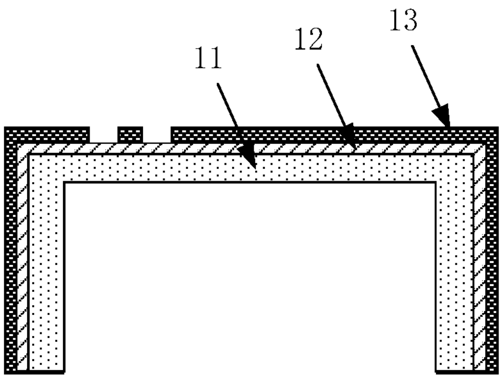

At S4, as shown in FIG. 4, the black ink layer 13 may be etched by laser to form a hollowed region at the black ink layer 13.

Figure 5:
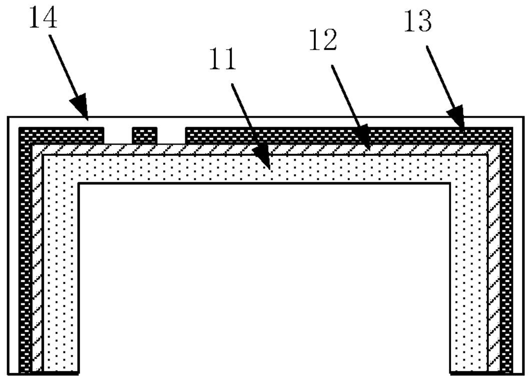

At S5, as shown in FIG. 5, a transparent protective layer 14 covering the ink layer 13 may be formed.

In response to the base layer 12 being light-transmitting, the hollowed region may pass through the ink layer 13. In response to the base layer 12 being not light-transmitting, the hollowed region may pass through the ink layer 13 and the base layer 12.

For the keycap formed by above-mentioned formation method, when backlight exits through the hollowed region of the keycap, the graphic mark on the keycap may be enabled to exit light. However, regardless of whether there is backlight, a character mark may be visible through the transparent protective layer 14 on the outside of the keycap.

Figure 6:
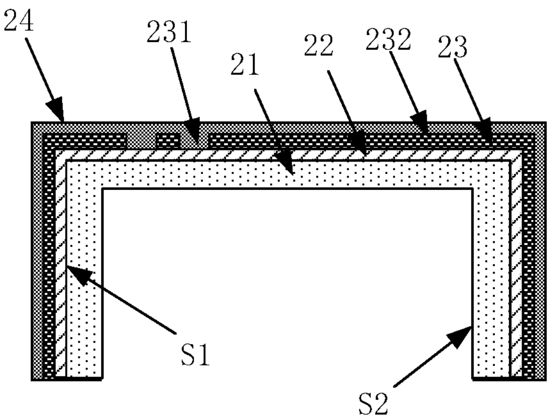
FIG. 6 illustrates a structural schematic of a base material according to various disclosed embodiments of the present disclosure.

Embodiment of the present disclosure provide a base material, applied to an electronic device. The base material is shown in FIG. 6. FIG. 6 illustrates a structural schematic of a base material according to various disclosed embodiments of the present disclosure.

The base material may include a transparent substrate 21, including a first surface S1 and a second surface S2 which are opposite to each other; a first film layer 23 disposed over the first surface S1 of the transparent substrate, where the first film layer 23 includes a first light transmittance and includes a hollowed region 231 and a non-hollowed region 232; and the hollowed region 231 is used as a first graphic mark; and further include a second film layer 24 disposed over the first film layer 23, where the second film layer 24 includes a second light transmittance and a set color, where the first light transmittance is less than the second light transmittance. That is, for the same visible light beam, the exit light intensity of the visible light beam passing through the first film layer 23 alone may be less than the exit light intensity of the visible light beam passing through the second film layer 24 alone.

In the base material, the second film layer 24 may have a color, and its light transmittance may be greater than the light transmittance of the first film layer 23. In such way, when no backlight exits through the first graphic mark, the second film layer 24 may reduce the visibility of the first graphic mark; and when the backlight exits through the first graphic mark, the first graphic mark which exits light of a preset color may be displayed based on the color of the backlight and the color of the second film layer 24. The backlight may exit along the direction from the transparent substrate 21 to the second film layer 24 in the hollowed region 231. In embodiments of the present disclosure, transparent means colorless or approximately colorless.

Since the first light transmittance is less than the second light transmittance, at least the light transmittance of the second film layer 24 may be greater than zero. Optionally, the light transmittance of the second film layer 24 may be equal to or greater than 10%. The second film layer 24 may have a color, which may reduce the visibility of the first graphic mark in the first film layer 23. By adjusting the transmittance and color of the second film layer 24, the blocking level to the hollowed region 231 may be adjusted.

Optionally, the second surface S2 may be covered with a reflective layer. When the backlight is turned on, for the backlight that is not directly irradiated to the hollowed region 231, by reflecting this part of the backlight multiple times on the reflective layer, the light exit efficiency of the backlight from the hollowed region 231 may be improved, thereby improving backlight utilization. The reflective layer may have an opening at a position corresponding to the hollowed region 231, so that the backlight may exit through the opening and the hollowed region.

In embodiments of the present disclosure, the second film layer 24 may be capable of blocking the first graphic mark under the first light condition and capable of displaying the first graphic mark under the second light condition. Under the first light condition, no backlight may exit, and under the second light condition, backlight may exit.

Figure 7:
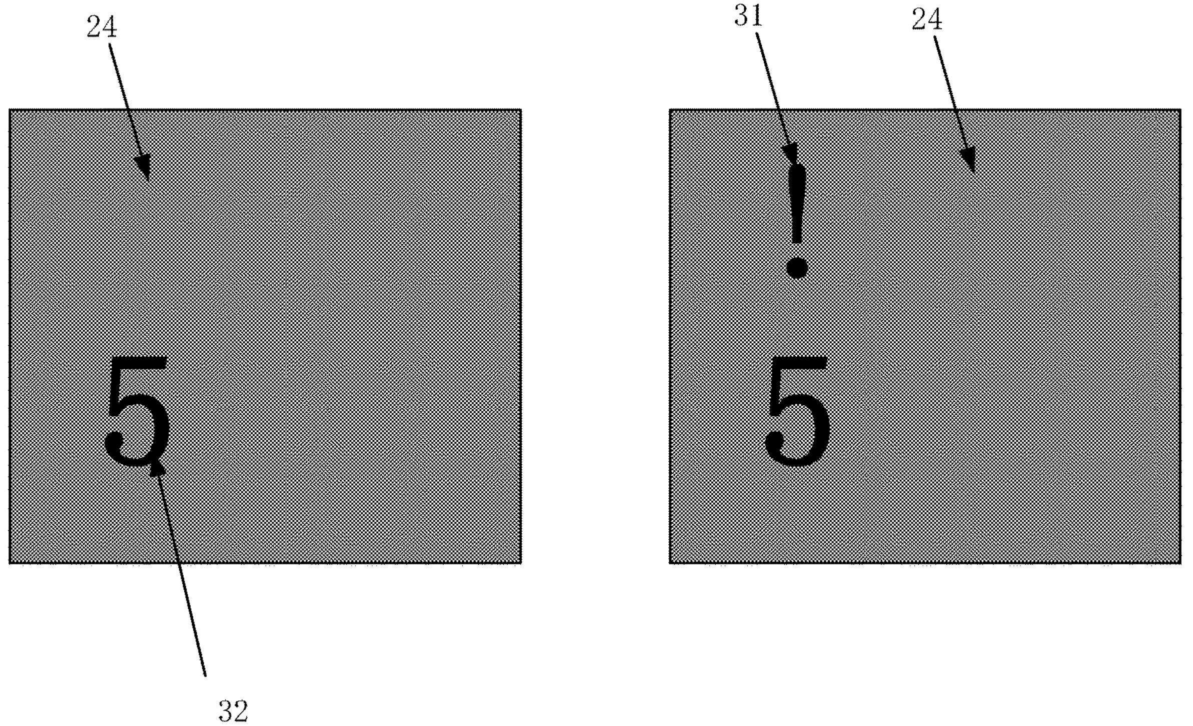
FIG. 7 illustrates different appearance display states of a base material according to various disclosed embodiments of the present disclosure.

FIG. 7 illustrates different appearance display states of a base material according to various disclosed embodiments of the present disclosure. The hollowed region in the first film layer 23 may be "!" as an example, that is, the first graphic mark 31 may be "!". As shown in the left in FIG. 7, when no backlight exits, due to the first film layer 23 being blocked by the second film layer 24 with a color and low light transmittance, the visibility of the first graphic mark 31 may be reduced, and even the first graphic mark 31 may be hidden within the range of human eye recognition. When there is backlight, the brightness of the exiting backlight may exceed the blocking effect of the second film layer 24, such that the first graphic mark 31 may be displayed through the exiting backlight.

In embodiment of the present disclosure, to increase the adhesion stability of the first film layer 23, the first surface S1 may be disposed with a base layer 22. The first film layer 23 may be on the surface of the base layer 22; and the base layer 22 may be configured to increase the adhesion stability of the first film layer 23. In response to the base layer 22 being a transparent material, the base layer 22 may be not disposed with a hollowed region. In response to the base layer 22 being a non-transparent material, the base layer 22 and the first film layer 23 may be configured to include same and opposite hollowed regions. At this point, the first film layer 23 and the base layer 22 may be simultaneously etched by laser to form hollowed regions passing through these two layers.

In response to that the first film layer 23 can be stably attached to the surface of the transparent substrate 21, the first film layer 23 may also be directly disposed on the surface of the transparent substrate 21.

Figure 8:
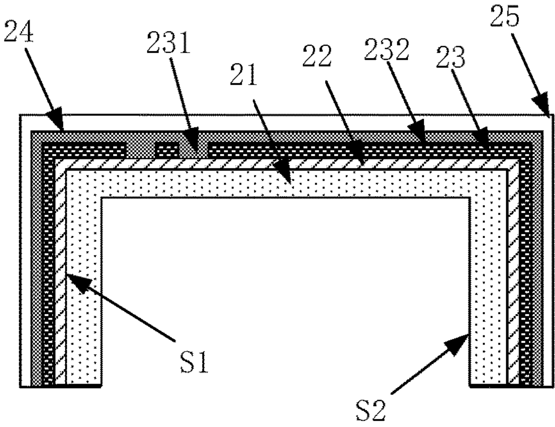
FIG. 8 illustrates a structural schematic of another base material according to various disclosed embodiments of the present disclosure.

FIG. 8 illustrates a structural schematic of another base material according to various disclosed embodiments of the present disclosure. On the basis of above-mentioned embodiments, in the base material shown in FIG. 8, a protective layer 25 may be disposed at the side of the second film layer 24 away from the first film layer 23. The protective layer 25, which is transparent, may be at least used for anti-fingerprint and/or anti-wear. Obviously, in response to that the second film layer 24 can satisfy wear resistance performance, the protective layer 25 may not be provided.

Figure 9:
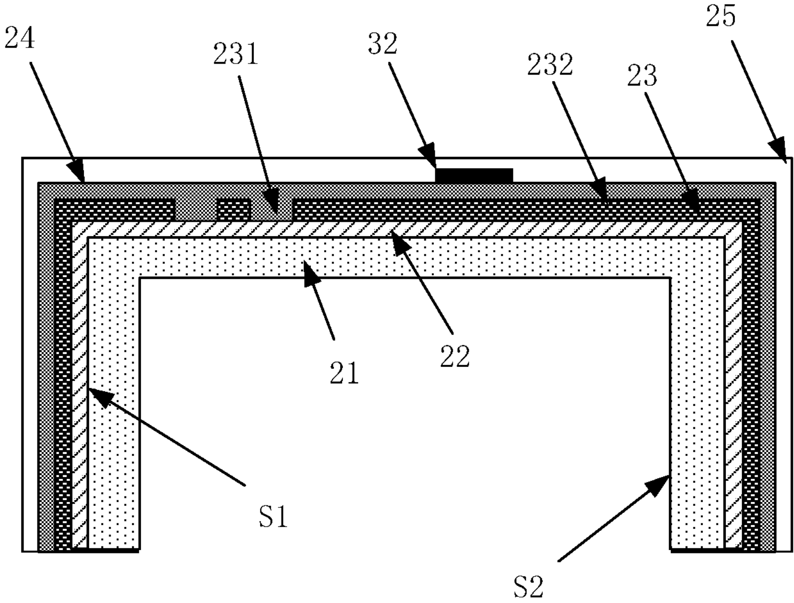
FIG. 9 illustrates a structural schematic of another base material according to various disclosed embodiments of the present disclosure.

FIG. 9 illustrates a structural schematic of another base material according to various disclosed embodiments of the present disclosure. On the basis of above-mentioned embodiments, in the base substrate shown in FIG. 9, the second graphic mark 32 may be disposed over the surface of the second film layer 24 on a side facing away from the transparent substrate 21. The second graphic mark 32 may not overlap the hollowed region 231. The second graphic mark 32 and the second film layer 24 may have different colors to better display the second graphic mark.

The second graphic mark 32 may be a non-transparent coating disposed on the surface of the second film layer 24, such as an ink layer. The color of the second film layer 24 may be different from the color of the second graphic mark 32 to clearly display the second graphic mark 32. To prevent the second graphic mark 32 from being worn out, the protective layer 25 may be disposed to cover the second film layer 24 and the second graphic mark 32. The second graphic mark 32 may have the third transmittance; and the third light transmittance may also be configured to be less than the second light transmittance to better display the second graphic mark.

In embodiments of the present disclosure, based on display effect requirement, the base material may be configured to dispose the first graphic mark or dispose both the first graphic mark and the second graphic mark. The first graphic mark may be displayed or hidden through backlight control based on display requirement.

Referring to FIG. 7 and FIG. 9, under the first light condition and the second light condition, the second graphic mark 32 may be displayed. The base material described in embodiments of the present disclosure may be used as a keycap of a key, the transparent substrate 21 may be a keycap shell, and the second surface S2 may be an inner surface of the keycap shell. The keycap may be capable of displaying the first graphic mark in the first working state and hiding the first graphic mark in the second working state.

In embodiments of the present disclosure, the base material may be used as the keycap of the key, the transparent substrate 21 may be the keycap shell, and the second surface S2 may be the inner surface of the keycap shell. The keycap may be capable of displaying the first graphic mark in the first working state and hiding the first graphic mark in the second working state. The key may be a key of a keyboard including a keyboard rotatably connected to a display screen in a notebook computer and a detachable keyboard for external connection of a device. The key may also be a key in a remote control of an electronic device.

The base material may also be used as a display board, such as an indoor or outdoor billboard for displaying information and the like. When ambient light is bright, such as in daytime, relevant information may be displayed through the second graphic mark having a different color from the second film layer 24, and backlight and power consumption may not be needed. That is, related information may be displayed through the second graphic mark. When ambient light is dark, such as at night, the backlight may be turned on, and relevant information may be displayed through the first graphic mark. The information characterized by the first graphic mark and the second graphic mark may be same or different.

The first graphic marks may be configured based on requirements, including but not limited to texts, geometric shapes, punctuation marks, mathematical symbols, and/or the like. The second graphic marks may be configured based on requirements, including but not limited to texts, geometric shapes, punctuation marks, mathematical symbols, and/or the like.

Based on above-mentioned embodiments, another embodiment of the present disclosure further provides a base material formation method, which is used to form the base material described in above-mentioned embodiments. The formation method is shown in FIGS. 10-14. FIGS. 10-14 illustrate an exemplary process of a base material formation method according to various disclosed embodiments of the present disclosure. The formation method may include following exemplary steps.

Figure 10:
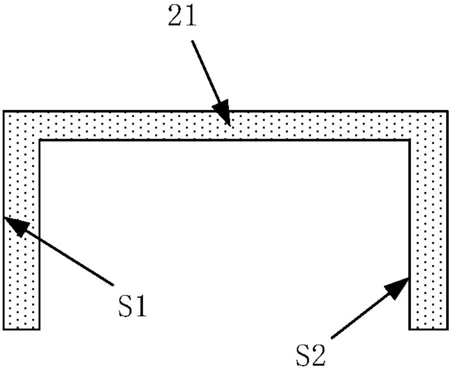
FIGS. 10-14 illustrate an exemplary process of a base material formation method according to various disclosed embodiments of the present disclosure.

At S11, as shown in FIG. 10, the transparent substrate 21 may be provided, and the transparent substrate 21 may include the first surface S1 and the second surface S2 which are opposite to each other.

The transparent substrate 21 may be a plastic substrate, or organic glass, tempered glass, or the like. The transparent substrate 21 may be a flat plate structure or a three-dimensional structure with a preset shape, which may be configured based on the requirement of an electronic device and may not be limited in various embodiments of the present disclosure.

Figure 11:
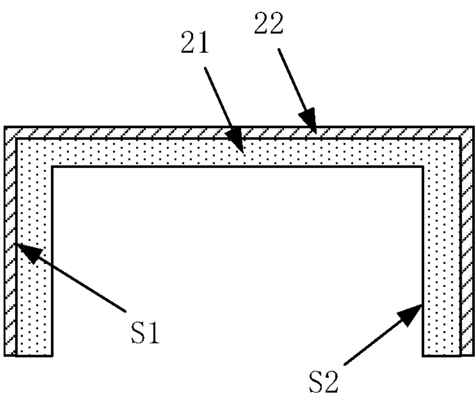
Figure 12:
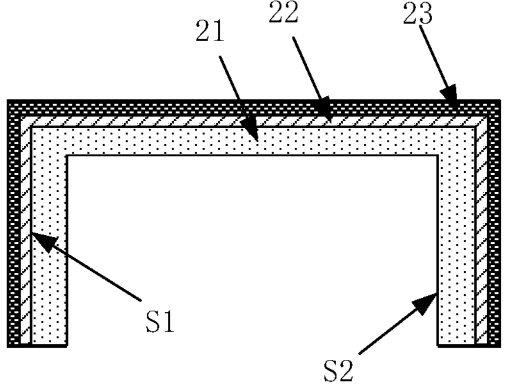
Figure 13:
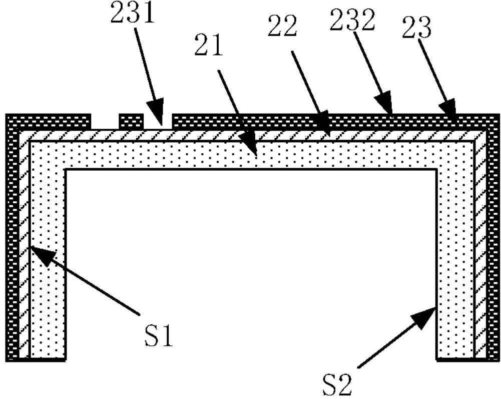

At S12, as shown in FIGS. 11-13, the first film layer 23 may be formed over the first surface S1; the first film layer 23 may include the first light transmittance and include the hollowed region 231 and the non-hollowed region 232; and the hollowed region 231 may be used as the first graphic mark.

For example, the method for forming the first film layer 23 may include following exemplary steps including S121-S123.

At S121, as shown in FIG. 11, the base layer 22 may be formed over the first surface S1.

At S122, as shown in FIG. 12, the first film layer 23 may be formed over the surface of the base layer 22.

At S123, as shown in FIG. 13, the first film layer 23 may be patterned, so that the first film layer 23 may include the hollowed region 231 and the non-hollowed region 232.

Figure 14:
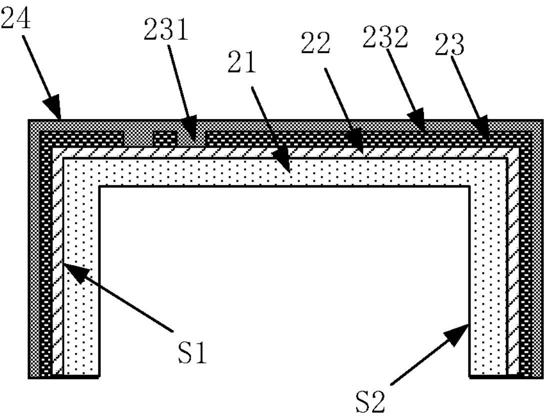

At S13, as shown in FIG. 14, the second film layer 24 may be formed over the surface of the first film layer 23. The second film layer 24 may include the second light transmittance and a set color. The first light transmittance may be less than the second light transmittance.

Through above-mentioned method, the base material shown in FIG. 6 may be formed. In the base material, the first graphic mark may be displayed or hidden by backlight, which may increase diversified display effect of the first graphic mark.

The formation method may further include forming the reflective layer over the second surface S2. The reflective layer may have an opening corresponding to the region of the first graphic mark.

The formation method may further include forming the protective layer 25 on the side of the second film layer 24 away from the transparent substrate 21, such that the base material as shown in FIG. 8 may be formed. The protective layer 25 may be a light-transmitting paint that can be solidified by UV radiation.

In embodiments of the present disclosure, the method for forming the first film layer 23 may include forming a first film material by a physical vapor deposition process; forming the hollowed region 231 passing through the first film material by a laser, thereby providing the first film layer 23 including the hollowed region 231; and attaching and fixing the first film layer 23 on the first surface of the transparent substrate. The thickness of the first film layer 23 formed by PVD may be relatively thin, which may be in the order of micrometers. The first film layer 23 may be configured to be not light-transmitting; that is, the light transmittance may be 0. In such way, as mentioned above, the first film layer 23 may be directly formed over the first surface S1; or the base layer 22 may be formed over the first surface S1, and then the first film layer 23 may be formed over the base layer 22.

In other manners, the method for forming the first film layer 23 may include providing the first film layer 23 including the hollowed region 231; and attaching and fixing the first film layer 23 over the first surface. At this point, the base layer 22 may be an adhesive layer for adhering and fixing the transparent substrate 21 with the first film layer 23.

Figure 15:
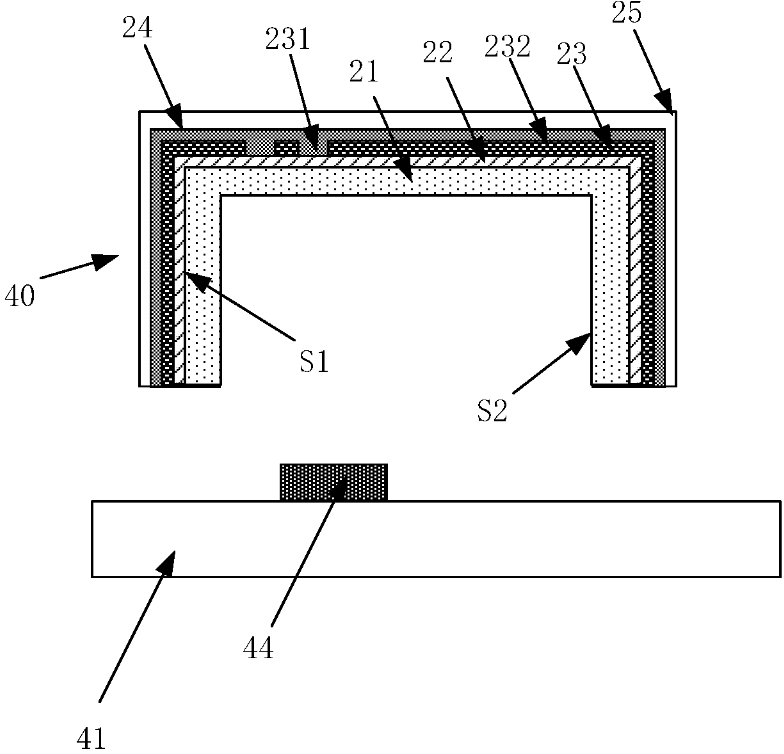
FIG. 15 illustrates a structural schematic of an electronic device according to various disclosed embodiments of the present disclosure.

Based on above-mentioned embodiments, another embodiment of the present application further provides an electronic device, as shown in FIG. 15. FIG. 15 illustrates a structural schematic of an electronic device according to various disclosed embodiments of the present disclosure. The electronic device may include a base material 40 described in above-mentioned embodiments and a light-emitting element 44.

The base material 40 may include the transparent substrate 21, including the first surface S1 and the second surface S2 which are opposite to each other; the first film layer 23 disposed over the first surface S1 of the transparent substrate, where the first film layer 23 includes the first light transmittance and includes the hollowed region 231 and the non-hollowed region 232; and the hollowed region 231 is used as the first graphic mark; and further include the second film layer 24 disposed over the first film layer 23, where the second film layer 24 includes the second light transmittance and a set color, where the first light transmittance is less than the second light transmittance.

The light-emitting element 44 may be on the side of the base material 40 facing the second surface S2. When the electronic device controls the light-emitting element 44 to be turned on, the backlight may pass through the hollowed region to display the first graphic mark, and when the electronic device controls the light-emitting element 44 to be turned off, the second film layer may be used to reduce the visibility of the first graphic mark.

The electronic device may include a circuit board 41, the light-emitting element 44 may be disposed on the circuit board 41, and the light-emitting state of the light-emitting element 44 may be controlled by the circuit board, thereby controlling the display state of the first graphic mark.

The electronic device may include the light-emitting element which may be disposed opposite to the first graphic mark and may emit backlight toward the inner surface of the keycap. When the light-emitting element is turned off and no backlight passes through the first graphic mark, the second film layer 24 may reduce the visibility of the first graphic mark; and when the light-emitting element is turned on and backlight passes through the first graphic mark, the first graphic mark which exits light of a preset color may be displayed based on the color of the backlight and the color of the second film layer 24, thereby realizing the diversified display of the key marks on the keys of the electronic device.

Figure 16:
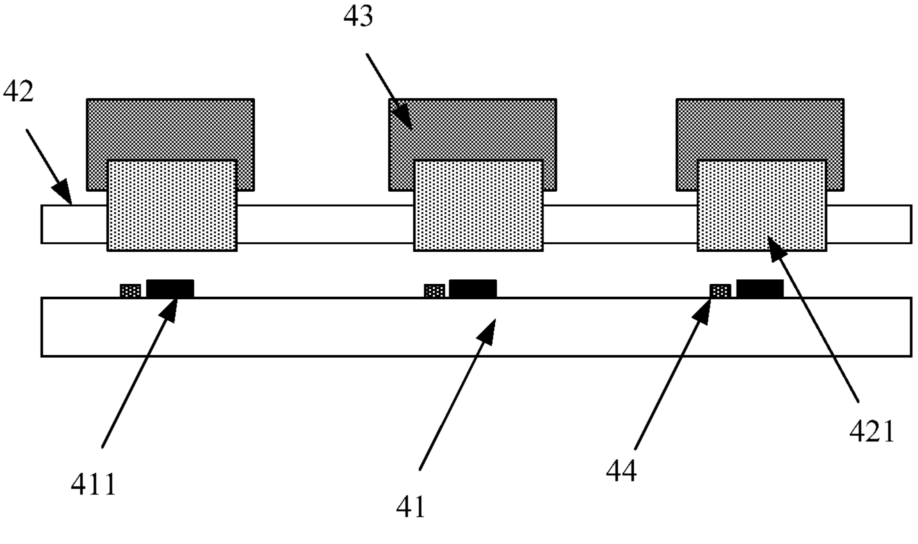
FIG. 16 illustrates another structural schematic of an electronic device according to various disclosed embodiments of the present disclosure.

FIG. 16 illustrates a structural schematic of another electronic device according to various disclosed embodiments of the present disclosure. Referring to FIGS. 15-16, the electronic device may include a key 43, where the keycap of the key 43 may include the base material 40; the circuit board 41 including a trigger electrode 411; and a support plate 42 disposed opposite to the circuit board 41. The support plate 42 may include a support column 421 that can be pressable and releasable; the support column 421 may be in contact with the trigger electrode 411 when being compressed and may be not in contact with the trigger electrode 411 when being uncompressed. The keycap of the key 43 may be installed on the support column 421.

The circuit board 41 may include the light-emitting element 44 which is disposed opposite to the key. When the light-emitting element 44 is turned off to not emit light, the first light condition may be satisfied, and when the light-emitting element 44 is turned on to emit light, the second light condition may be satisfied.

The electronic device may be configured to include one or more keys 43. When there are multiple keys 43, the electronic device may include multiple support columns 421 and multiple trigger electrodes 411 which have a one-to-one correspondence with the keys 43.

In one manner, as shown in FIG. 16, each key 43 may be configured with a corresponding light-emitting element 44; and each light-emitting element 44 may be independently controlled, thereby individually controlling the display effect of the first graphic mark in each key 43.

In another manner, the light-emitting element 44 may be a backlight module disposed between the support plate 42 and the circuit board 41; and one backlight module may be configured to provide backlight for all keys 43. At this point, all first graphic marks may emit backlight, or may not emit backlight simultaneously.

Optionally, a locking element may be disposed on the side of the base material facing the second surface. The locking element may be configured to install and fix the base material. For example, when the base material is configured for a key, the locking element may be configured to fix the key 43 on the support column 421.

In order to reduce blocking of the backlight by the support column 421, the support column 421 may be configured to be a light-transmitting material, or the support column 421 may have a light-transmitting hole for light transmission.

The electronic device described in embodiments of the present disclosure may be any electronic device with mechanical keys, including a notebook computer, a separate keyboard, a remote control, and the like. By controlling the exiting state of the backlight, the electronic device may control the display effect of the first graphic mark in the key and realize the diversified display of the graphic mark on the key.

In the electronic device described in embodiments of the present disclosure, the substrate 40 may not be limited to be used as keys but may also be used as the shell of the electronic device, and the first graphic mark may be displayed through the shell. For example, the first graphic mark may represent a product logo and a working status indicator. When the electronic device is turned on, the electronic device may control the display of the first graphic mark; and when the electronic device is turned off, the electronic device may control hiding of the first graphic mark.

Referring to FIG. 9, FIG. 15, and FIG. 16, the electronic device may include the key 43, the keycap of the key 43 may include the base material 40, the second graphic mark 32 may be disposed over the second film layer 24 on a side facing away from the transparent substrate, where the second graphic mark 32 may not overlap the hollowed region 231; characterization information of the first graphic mark is different from characterization information of the second graphic mark; and the key may be configured to trigger the first function characterized by the first graphic mark and trigger the second function characterized by the second graphic mark, where the use frequency of the first function may be less than the use frequency of the second function. The use frequency may be determined based on big data statistics of multiple users or determined based on user use habits.

The electronic device may be configured to include the first working mode and the second working mode. It may be configured that in the first working mode, the backlight may be turned on, and the first graphic mark and the second graphic mark may be displayed simultaneously; and in the second working mode, the backlight may be turned off, and only the second graphic mark may be displayed.

In embodiments of the present disclosure, when the first graphic mark is displayed, the first graphic mark may be configured to characterize the key position for inputting configuration information.

Or, when the first graphic mark is displayed, the first graphic mark may be configured to characterize the working mode of another device connected to the electronic device. When displaying the working mode of another device through the first graphic mark, the input device may be at least capable of selecting different colors to display the first graphic mark to characterize that another device is in a different working mode. By configuring red, green, and blue light-emitting elements, such as LEDs, under the keys and by controlling the light-emitting intensity and ratio of the light-emitting elements, the first graphic mark of a desired color may be displayed in combination with the color of the second film layer.

For example, the letter key of the notebook computer may include the first graphic mark; and the first graphic mark may be a fan icon, and the display effect thereof may be used to characterize the run state of the fan in the notebook computer. The letter key may include a letter Q as the second graphic mark. When the first graphic mark is not displayed, it may characterize that the notebook computer is in an energy-saving working mode, and the fan is turned off or operates at a lower power consumption. When the first graphic mark displays green, it may characterize that the fan is in an intelligent working mode, and the notebook computer automatically adjusts the working power of the fan based on the working state. When the first graphic mark displays red, it may characterize that the fan is in an extreme performance mode running at a set high power. The combination trigger method of the key and other keys, such as the combination trigger of the key Fn+the key Q, may input a control command for the notebook computer to switch the working mode of the notebook computer.

The electronic device described in above-mentioned embodiments of the present disclosure may be multiple keys. It may be configured that all keys may only have the first graphic marks; at this point, when there is no backlight, all key marks may be completely hidden. It may also be configured at least some of the keys to have both the first graphic marks and the second graphic marks.

The input device in embodiments of the present disclosure may be used to input information for other devices. The electronic device may include the first key mark set including at least one first graphic mark, and the second key mark set including at least one second graphic mark. The first graphic mark in the first key mark set may be on one or more keys. The second graphic mark in the second key mark set may be on one or more keys.

In the first key mark set, different first graphic marks may characterize different first information. In the second key mark set, different second graphic marks may characterize different second information. The electronic device may include a controller which may be connected to the trigger electrode 411.

The controller may be configure to, in the first working mode, control the light-emitting element 44 to be turned on to emit backlight, and input the first information for the first device in response to the input operation of the key on the trigger electrode; and in the second working mode, control the light-emitting element 44 to be turned off to turn off backlight, and input the second information for the first device in response to the input operation of the key on the trigger electrode. For example, in a notebook keyboard, the first graphic mark may be configured as a less than sign, the second graphic mark may be configured as a comma, and these two marks may be located on a same key. Compared with punctuation marks, mathematical symbols may be used less frequently. Therefore, when the device is in the second working mode, the less than sign may not be displayed, and the appearance of the keyboard may be displayed through concise key marks. When the less than sign needs to be inputted, key trigger may be configured to turn on the light-emitting element 44 and display the comma.

In other manners, the controller may be configured to, in the first working mode, control the light-emitting element 44 to be turned on to emit backlight, and input the first information for the first device in response to the input operation of the key on the trigger electrode; and may be configured to, in the second working mode, control the light-emitting element to be turned off to turn off backlight, and input the second information to the second device in response to the input operation of the key on the trigger electrode. The first device may be different from the second device. In such manner, the electronic device may be configured as a remote controller, and the first device and the second device may be different types of home appliances. Multiple first key mark sets may be configured, which may be respectively used to perform input information to different types of devices.

According to the base material, the formation method, and the electronic device provided in the present disclosure, the base material includes the transparent substrate, including the first surface and the second surface which are opposite to each other; the first film layer disposed over the first surface of the transparent substrate, where the first film layer includes the first light transmittance and includes the hollowed region and the non-hollowed region; and the hollowed region is used as the first graphic mark; and the second film layer disposed over the first film layer, where the second film layer includes the second light transmittance and a set color, where the first light transmittance is less than the second light transmittance.

Various embodiments of the present disclosure are described in a progressive manner, or in a parallel manner, or in a combination of progressive and parallel manners. Each embodiment may focus on differences from other embodiments, and same and similar parts between various embodiments may be referred to each other. For the formation method and the electronic device disclosed in embodiments of present disclosure, since they correspond to the base material disclosed in embodiments of present disclosure, the description may be relatively simple, and relevant detail may refer to the description of corresponding parts of the base material.

It should be noted that, in the description of the present disclosure, it should be understood that the orientation or positional relationship indicated by the terms upper", "lower", "top", "bottom", "inner", "outer" and the like which is based on the orientation or positional relationship shown in the drawings may be merely for the convenience of describing the present disclosure and simplifying the description, rather than indicating or implying that indicated device or element must have a specific orientation, be constructed and operated in a specific orientation; therefore, it should not be understood as a limitation on the present disclosure. When a component is "connected" to another component, it may be directly connected to another component or there may be a centered component at the same time.

It should also be noted that in the present disclosure, relational terms such as first, second and the like may be merely used to distinguish one entity or operation from another entity or operation and may not necessarily require or imply any such actual relationship or order between these entities or operations. Moreover, the terms "include", "contain" or any other variations thereof may be intended to cover non-exclusive inclusion, so that a process, method, article, or equipment that includes a series of elements includes not only those elements, but also other elements that are not explicitly listed, or also includes elements inherent to the process, method, article, or equipment. If there are no more restrictions, the elements defined by the sentence "include a . . . " does not exclude the existence of other same elements in the process, method, article, or equipment that includes the elements.

Above description of disclosed embodiments may enable those skilled in the art to make or use the present disclosure. Various modifications to these embodiments may be readily apparent to those skilled in the art, and the generic principles defined herein may be implemented in other embodiments without departing from the spirit or scope of the present disclosure. Therefore, the present disclosure may not be intended to be limited to embodiments of the present disclosure but may be accorded the widest scope consistent with the principles and novel features disclosed herein.

What is claimed is:

1. A physical structure, applied to an electronic device, comprising:

a transparent substrate, including a first surface and a second surface which are opposite to each other;

a first film layer disposed over the first surface of the transparent substrate, wherein the first film layer includes a first light transmittance and includes a hollowed region and a non-hollowed region, the hollowed region is more light-transmissible than the non-hollowed region, and the hollowed region is so shaped that when backlight passes through the hollowed region, the physical structure including the first film layer displays a first graphic mark, such that the hollowed region is used as the first graphic mark; and a second film layer disposed over the first film layer, wherein the second film layer includes a second light transmittance and a set color, the first light transmittance is less than the second light transmittance, and wherein:

a second graphic mark is disposed over the second film layer on a side facing away from the transparent substrate, wherein the second graphic mark does not overlap the hollowed region;

a base layer is disposed over the first surface of the transparent substrate, wherein the first film layer is over the base layer; and the base layer is used to increase adhesion stability of the first film layer;

a protective layer is disposed over the second film layer on a side facing away from the first film layer, wherein the protective layer is at least used for anti-fingerprint and/or anti-wear; and/or the second film layer is capable of blocking the first graphic mark under a first light condition and displaying the first graphic mark under a second light condition.

2. The physical structure according to claim 1, wherein: the second light transmittance of the second film layer is greater than or equal to 10%.

3. The physical structure according to claim 1, wherein: the physical structure is used as a keycap of a key, the transparent substrate is a keycap shell, and the second surface is an inner surface of the keycap shell; and the keycap is capable of displaying the first graphic mark in a first working state and hide the first graphic mark in a second working state.

4. The physical structure according to claim 1, wherein: the second graphic mark and the second film layer have different colors.

5. The physical structure according to claim 1, wherein: the second graphic mark has a third transmittance; and the third light transmittance is less than the second light transmittance.

6. An electronic device, comprising:

the physical structure according to claim 1; and a light-emitting element on a side of the physical structure facing the second surface of the transparent substrate, wherein when the light-emitting element is controlled to turn on, backlight passes through the hollowed region to display the first graphic mark through the second film layer that covers the hollowed region; and when the light-emitting element is controlled to turn off, the second film layer is configured to reduce visibility of the first graphic mark.

7. The electronic device according to claim 6, further including:

a key, wherein a keycap of the key includes the physical structure; a circuit board including a trigger electrode; and a support plate disposed opposite to the circuit board, wherein the support plate includes a support column that is pressable and releasable; the support column is in contact with the trigger electrode when being compressed and is not in contact with the trigger electrode when being uncompressed; the keycap of the key is installed on the support column; and the light-emitting element is disposed over the circuit board on a side opposite to the key; or the electronic device further including a shell which includes the physical structure.

8. The electronic device according to claim 6, wherein:

the electronic device includes a key; and a keycap of the key includes the physical structure;

a second graphic mark is disposed over the second film layer on a side facing away from the transparent substrate, wherein the second graphic mark does not overlap the hollowed region; and characterization information of the first graphic mark is different from characterization information of the second graphic mark; and the key is configured to trigger a first function characterized by the first graphic mark and trigger a second function characterized by the second graphic mark, wherein a use frequency of the first function is less than a use frequency of the second function.

9. The electronic device according to claim 6, wherein:

the electronic device includes a key, and a keycap of the key includes the physical structure;

when the first graphic mark is displayed, the first graphic mark is configured to characterize a position of a key or configured to characterize a working mode of another device connected to the electronic device; and when the working mode of the another device is displayed through the first graphic mark, an input device is at least capable of selecting different colors to display the first graphic mark to characterize that the another device is in a different working mode.

* * * * *